United States Patent [19]

Chambers

[11] Patent Number: 4,917,354

[45] Date of Patent: Apr. 17, 1990

[54] DUAL ACTION BALL VALVE

[76] Inventor: James F. Chambers, 17 Woodberry Rd., Little Rock, Ark. 72212

[21] Appl. No.: 295,452

[22] Filed: Jan. 10, 1989

[51] Int. Cl.⁴ .............................................. F16K 5/06
[52] U.S. Cl. ...................................... 251/163; 251/160
[58] Field of Search ....................... 251/160, 162, 163

[56] References Cited

U.S. PATENT DOCUMENTS 3,207,468 9/1965 Landucci et al. ............... 251/163 X

FOREIGN PATENT DOCUMENTS 1354188 1/1964 France ................................. 251/163

Primary Examiner—John Fox

Attorney, Agent, or Firm—Brady, O'Boyle & Gates

[57] ABSTRACT

A dual-action ball valve having a sleeve fixedly mounted within the valve bonnet. Spiral slots are provided in the sleeve for receiving a transverse guide pin mounted in the valve stem. The lower end of the valve stem is provided with sloping cam surfaces cooperating with tapered side walls provided in an apertured insert mounted in the top wall of the ball valve through which the stem extends. A pair of upwardly extending arcuate members are formed on the insert and engage the lower end of the valve bonnet bushing to provide a trunnion for the ball valve. The components of the dual-action ball valve provide increased bearing surfaces to facilitate use of the valve in high pressure systems.

3 Claims, 2 Drawing Sheets

DUAL ACTION BALL VALVE

BACKGROUND OF THE INVENTION

This invention relates to dual-action rotary valves of the type wherein a ball valve is moved relative to a flow passage into and out of positive sealing engagement with the valve seat, whereby it may be rotated free of frictional engagement with the seat. These dual-action ball valves have typically included a valve stem threadably connected at its upper end to a drive nut connected to a hand wheel. The lower end of the stem extends into the ball valve and is provided with sloping cam surfaces which engage roller pins mounted in the ball valve. The stem is provided with a spiral groove for receiving a fixed stem guide secured to the valve bonnet. By this construction and arrangement, when the hand wheel is turned to open the valve, the stem first slides axially with respect to its longitudinal axis to cause the ball valve to move relative to the flow passage out of sealing engagement with the valve seat. Continued turning of the hand wheel causes the ball valve to be rotated 90° to the open position.

The dual-action ball valves are customarily employed as master valves in high pressure systems involving oil/gas separation facilities, hot oil systems, pumping stations, well heads, metering facilities, emergency shutdown systems, and the like.

It has been found that the prior art dual-action ball valves experienced excessive bearing loads on the stem guide and spiral groove when rotating the valve to the open and closed positions, and also on the cam surface on the lower end of the stem and cooperating roller pins, wherein the bearing surfaces are minimal in both areas. These weaknesses are responsible for most field problems and customer complaints.

To overcome the excessive bearing loads encountered in prior dual-action rotary valves, the dual-action rotary valve of the present invention has been devised to increase the bearing surfaces on the various components of the valve, wherein a sleeve having a pair of spiral slots is fixedly secured to the valve bonnet and the valve stem is provided with a pair of guide pins extending into the slots. A ball insert is mounted on the top of the ball valve and is provided with a bearing surface cooperating with a sloping cam surface on the lower end of the valve stem. The upper surface of the ball insert is provided with a pair of upwardly extending arcuate members engaging the lower end of the valve bonnet bushing, to thereby provide a trunnion to facilitate tilting the ball valve relative to the valve seat. The lower end of the valve stem is also provided with an arcuate concave portion which is adapted to receive a correspondingly configured convex portion on the ball insert to enhance the holding of the ball valve in the closed position.

DESCRIPTION OF THE PREFERRED EMBODIMENT

Figure 1:
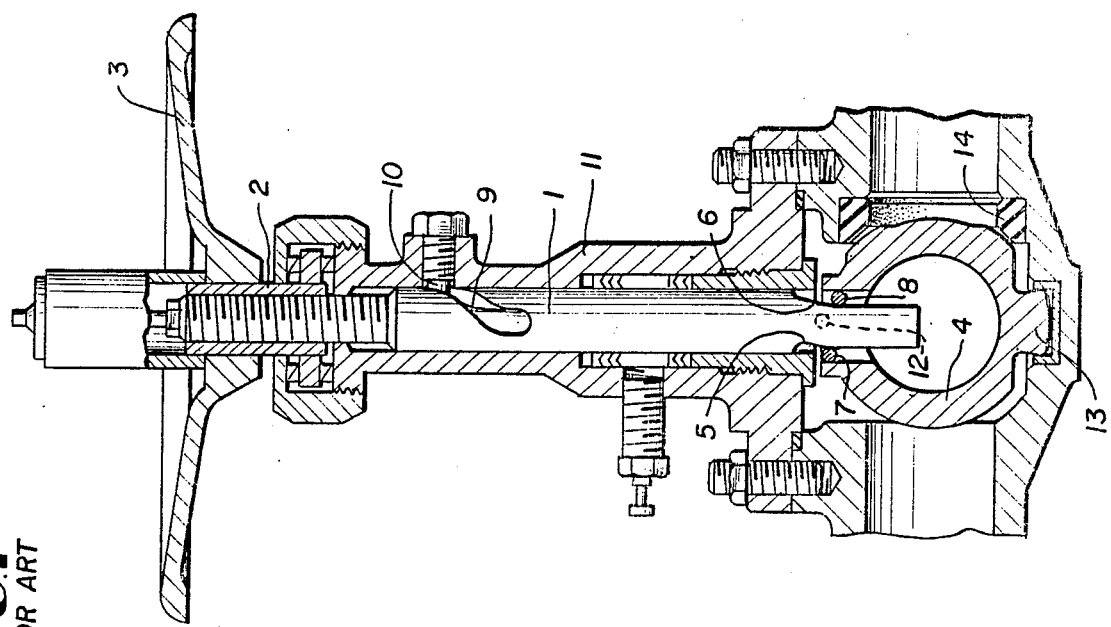
FIG. 1 is a sectional side elevational view of a prior art dual-action rotary valve.

Referring to the drawings and more particularly to FIG. 1, the dual-action rotary valve to which the present invention pertains typically comprises a valve stem 1 threadably connected at its upper end to a drive nut 2 connected to a hand wheel 3. The lower end of the stem 1 extends into a ball valve 4 and is provided with sloping cam surfaces 5, 6 which engage roller pins 7, 8 mounted in the ball valve. The stem 1 is provided with a spiral groove 9 for receiving a fixed stem guide 10 secured to the valve bonnet 11. By this construction and arrangement, when the hand wheel 3 is turned to move the ball valve 4 to the open position, the stem 1 first slides axially with respect to its longitudinal axis to cause the ball valve 4 to tilt about support pins 12 and trunnion 13, to thereby move the ball valve 4 out of sealing engagement with the valve seat 14. Continued turning of the hand wheel causes the ball valve 4 to be rotated 90° to the open position.

While the prior art dual-action rotary valves of FIG. 1 have been satisfactory for their intended purpose, they have experienced some difficulties when used in high pressure systems due to excessive bearing loads not only on the stem guide 10 and spiral groove 9 when rotating the valve 4 to the open and closed positions, but also on the cam surfaces 5 and 6 on the lower end of the stem 1 and cooperating roller pins 5, 6 and support pins 12 wherein the bearing surfaces are minimal.

Figure 2:
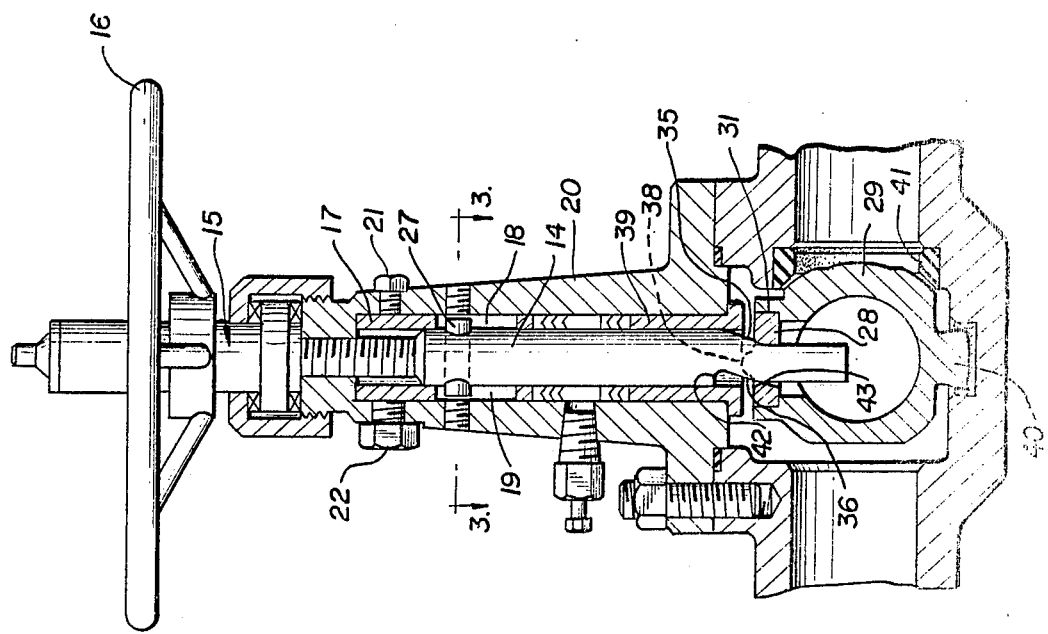
FIG. 2 is a sectional side elevational view of the dual-action ball valve of the present invention.
Figure 3:
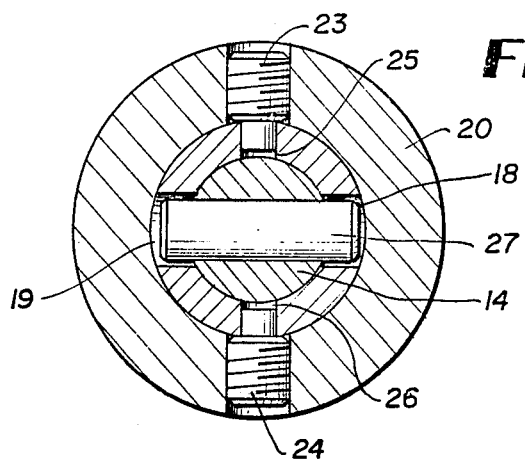
FIG. 3 is a view taken along line 3—3 of FIG. 2.
Figure 4:
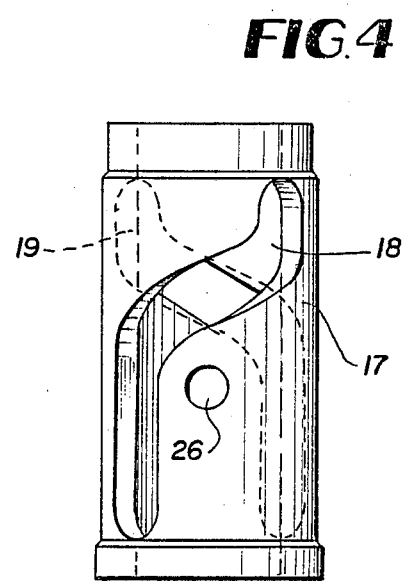
FIG. 4 is a side elevational view of the slotted sleeve employed in the valve assembly of the present invention.

To overcome the objections experienced with the prior art dual-action rotary valves when employed in high pressure systems, the dual-action rotary valve of the present invention has been devised which is illustrated in FIG. 2 and comprises a valve stem 14 threadably connected at its upper end to a drive nut 15 connected to a hand wheel 16. A sleeve 17 having a pair of spiral slots 18, 19 (FIG. 4) is positioned within the valve bonnet 20 coaxially with respect to the valve stem 14. The sleeve 17 is fixedly mounted within the valve bonnet by a first pair of set screws 21, 22 threadably mounted in the upper end portion of the valve bonnet 20 and engaging the outer wall surface of the sleeve 17, and a second pair of screws 23, 24 (FIG. 3), oriented 90° from the first pair of screws 21, 22, threadably mounted in the valve bonnet 20 and having their inner end portions extending into apertures 25, 26 provided in the side wall of the sleeve. A transverse guide pin 27 is mounted in the valve stem 14 and has its opposite ends extending into the fixed sleeve slots 18 and 19. By this construction and arrangement, rotation of the hand wheel 16 will cause the valve stem 14 to move axially with respect to its longitudinal axis.

Figure 5:
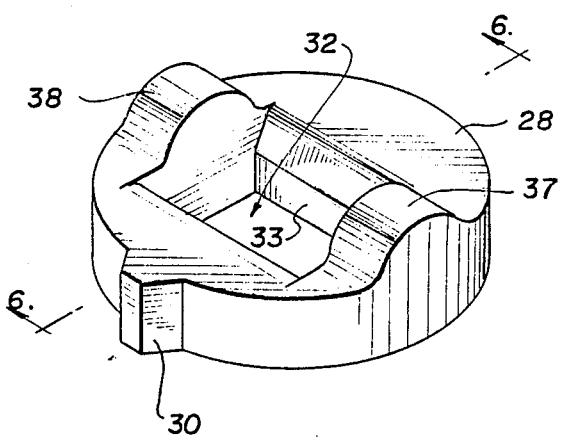
FIG. 5 is a perspective view of the ball valve insert.
Figure 6:
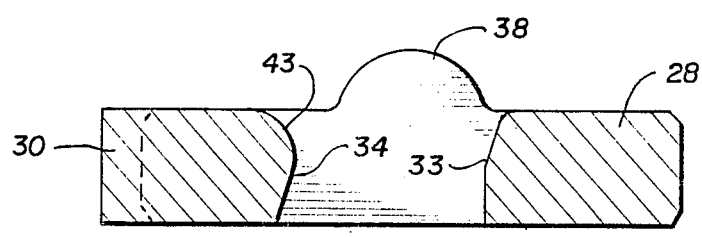
FIG. 6 is a sectional view taken along line 6—6 of FIG. 5.

The lower end of the valve stem 14 extends through an insert member 28 mounted in the upper wall of the ball valve 29. The details of the construction of the insert member 28 are shown in FIGS. 5 and 6 wherein it will be seen that the member is configured as a disc having a key 30 integrally formed on the side wall thereof adapted to be received within a correspondingly configured groove provided in the side wall of a recess 31 (FIG. 2) in the upper wall of the ball valve 29 into which the insert is seated. The insert member 28 is provided with an aperture 32 through which the lower end of the valve stem 14 extends, the walls 33, 34 of the insert 28 on each side of the aperture 32 having a tapered bearing surface cooperating with sloping cam surfaces 35, 36 on the lower end of the valve stem 14. A pair of upwardly extending arcuate members 37, 38 are integrally formed on the upper surface of the insert adjacent each end of the aperture 32 and are adapted to engage the lower end of the valve bonnet bushing 39, as shown in FIG. 2, to thereby provide a trunnion cooperating with the trunnion 40 on the bottom of the ball valve, whereby the ball valve 29 is tilted relative to the valve seat 41 during the sliding movement of the stem cam surfaces 35, 36 relative to the tapered bearing surfaces 33, 34 in the insert 28.

The lower end of the valve stem 14 is also provided with an arcuate concave portion 42 which is adapted to receive a correspondingly configured convex portion 43 on the side wall 34 of the insert aperture 32 to enhance the holding of the ball valve 29 in the closed position.

In the operation of the dual-action ball valve of the present invention, when the hand wheel 16 is turned to move the ball valve 29 to the open position, the pin 27 slides in the sleeve slots 18 and 19 causing the stem 14 to slide axially with respect to its longitudinal axis. During this sliding motion, the sloping cam surfaces 35, 36 on the lower end of the stem 14 slide against the tapered bearing surfaces of the insert walls 33, 34 causing the ball valve 29 to tilt on its upper trunnion 37, 38 and lower trunnion 40 to thereby move the ball valve 29 away from the valve seat 41. Continued rotation of the hand wheel 16 causes the ball valve to be rotated 90° to the open position.

It will be appreciated by those skilled in the art that the sleeve 17 having the pair of spiral slots 18 and 19 engaged by the opposite end portions of the stem guide pin 27 provide more bearing surfaces than provided by the guide pin 10 extending into the stem slot 9, as shown in the prior art. Furthermore, the tapered bearing surfaces 33, 34 in the apertured insert 28 cooperating with the sloping cam surfaces 35, 36 on the valve stem 14 provide more bearing surfaces than the roller pins 7 and 8 employed in the prior art dual-action ball valve, and the upper trunnion 37, 38 also provides an increased bearing surface over that provided by the support pins 12 shown in the prior art. These increased bearing surfaces facilitate the use of the dual-action ball valve in high pressure systems and enhance their reliability for long and continued use.

It is to be understood that the form of the invention herewith shown and described is to be taken as a preferred form of the invention, and that various changes in the shape, size and arrangement of parts may be resorted to, without departing from the spirit of the invention or scope of the subjoined claims.

I claim

1. In a dual-action ball valve of the type wherein a valve stem is mounted in a valve bonnet and a bonnet bushing and threadably connected at its upper end to a drive nut connected to a hand wheel and its lower end slidably received in the ball valve, whereby initial rotation of the hand wheel to open the valve causes the ball valve to move away from the valve seat and continued rotation causes the ball valve to rotate 90° to the open position, the improvement comprising a sleeve fixedly mounted within the valve bonnet and surrounding the valve stem, a pair of spiral slots provided in the side wall of said sleeve, a transverse guide pin mounted in the valve stem and having its opposite end portions extending into the sleeve slots, an insert member mounted on the upper wall of the ball valve, said insert member comprising a disc having an aperture, the lower end of said valve stem extending through said aperture, said aperture having tapered bearing wall surfaces cooperating with sloping cam surfaces on the lower end portion of the valve stem, and arcuate members integrally formed on the upper surface of the insert adjacent each end of the aperture and engaging the lower end of the valve bonnet bushing to thereby provide a trunnion, whereby the ball valve is tilted relative to the valve seat during the sliding movement of the stem cam surfaces relative to the tapered bearing surfaces in the insert.

2. In a dual-action ball valve according to claim 1, wherein an arcuate concave portion is provided on the lower end of the valve stem, and a correspondingly configured convex portion is provided on one of the side walls of the insert aperture, whereby the concave portion on the stem is adapted to receive the convex portion on the insert side wall to thereby enhance the holding of the ball valve in the closed position.

3. In a dual-action ball valve of the type wherein a valve stem is mounted in a valve bonnet and a bonnet bushing and threadably connected at its upper end to a drive nut connected to a hand wheel and its lower end slidably received in the ball valve, whereby initial rotation of the hand wheel to open the valve causes the ball valve to move away from the valve seat and continued rotation causes the ball valve to rotate 90° to the open position, the improvement comprising a sleeve fixedly mounted within the valve bonnet and surrounding the valve stem, a pair of spiral slots provided in the side wall of said sleeve, a transverse guide pin mounted in the valve stem and having its opposite end portions extending into the sleeve slots, an insert member mounted on the upper wall of the ball valve, said insert member comprising a disc having an aperture, the lower end of said valve stem extending through said aperture, said aperture having tapered bearing wall surfaces cooperating with sloping cam surfaces on the lower end portion of the valve stem, and an arcuate concave portion provided on the lower end of the valve stem, and a correspondingly configured convex portion provided on one of the side walls of the insert aperture, whereby the concave portion on the stem is adapted to receive the convex portion on the insert side wall to thereby enhance the holding of the ball valve in the closed position.

* * * * *

REEXAMINATION CERTIFICATE (1916th)
United States Patent [19]
Chambers

[11] B1 4,917,354

[45] Certificate Issued Jan. 26, 1993

[54] DUAL ACTION BALL VALVE

[75] Inventor: James F. Chambers, Little Rock, Ark.

[73] Assignee: Grove Valve and Regulator Company, Oakland, Calif.

Reexamination Request:
No. 90/002,347, May 16, 1991

Reexamination Certificate for:
Patent No.: 4,917,354
Issued: Apr. 17, 1990
Appl. No.: 295,452
Filed: Jan. 10, 1989

[51] Int. Cl.5 ............................................. F61K 5/06
[52] U.S. Cl. ................................. 251/163; 251/160; 74/57
[58] Field of Search ............... 251/162, 163, 164, 160; 74/424.8, 57

[56] References Cited

U.S. PATENT DOCUMENTS

| | | | |
|---|---|---|---|
| 2,076,841 | 4/1937 | Heggem | 251/164 |
| 3,207,468 | 9/1965 | Landucci et al. | 251/163 X |
| 3,388,603 | 6/1968 | Clark | 74/57 |
| 3,606,801 | 9/1971 | Williams | 74/424.8 UA X |
| 4,666,124 | 5/1987 | Giacobbi | 74/57 X |

FOREIGN PATENT DOCUMENTS 1354188  1/1964  France ................................. 251/163

OTHER PUBLICATIONS

Orbit Valve Company Instruction Manual No. 58, 1958.
Orbit Repair Manual No. 62, 1962.
Orbit Catalog 77-B, 1977.

*Primary Examiner*—John C. Fox

[57] ABSTRACT

A dual-action valve having a sleeve fixedly mounted within the valve bonnet. Spiral slots are provided in the sleeve for receiving a transverse guide pin mounted in the valve stem. The lower end of the valve stem is provided with sloping cam surfaces cooperating with tapered side walls provided in an apertured insert mounted in the top wall of the ball valve through which the stem extends. A pair of upwardly extending arcuate members are formed on the insert and engage the lower end of the valve bonnet bushing to provide a trunnion for the ball valve. The components of the dual-action ball valve provide increased bearing surfaces to facilitate use of the valve in high pressure systems.

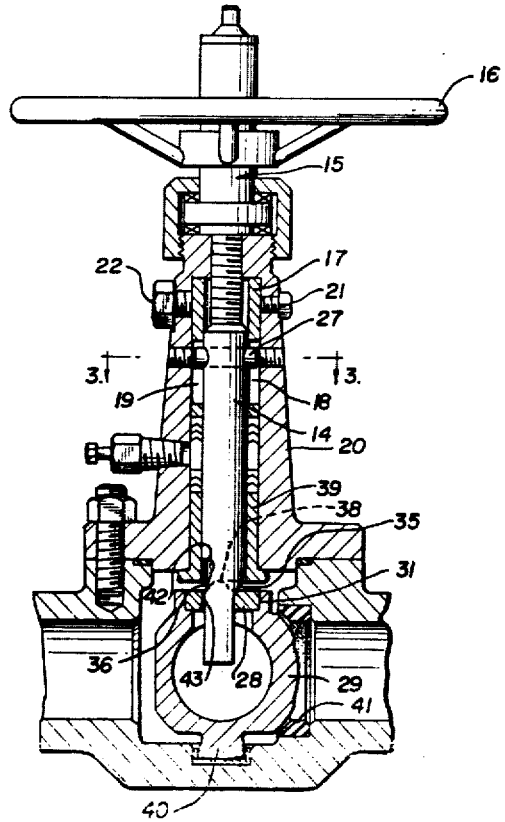

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claim 2, dependent on an amended claim, is determined to be patentable.

New claims 4–8 are added and determined to be patentable.

1. In a dual-action ball valve of the type wherein a valve stem is mounted in a valve bonnet and a bonnet bushing and threadably connected at its upper end to a drive nut connected to a hand wheel and its lower end slidably received in the ball valve, whereby initial rotation of the hand wheel to open the valve causes the ball valve to move away from the valve seat and continued rotation causes the ball valve to rotate 90° to the open position, the improvement comprising a sleeve fixedly mounted within the valve bonnet and surrounding the valve stem, *said stem being slidable in the sleeve, said sleeve being readily removable and replaceable,* a pair of spiral slots provided in the side wall of said sleeve, *said slots extending through the side wall of sleeve and each having at least one closed end,* a transverse guide pin mounted in the valve stem and having its opposite end portions extending into the sleeve slots, an insert member mounted on the upper wall of the ball valve, said insert member comprising a disc having an aperture, the lower end of said valve stem extending through said aperture, said aperture having tapered bearing wall surfaces cooperating with sloping cam surfaces on the lower end portion of the valve stem, and arcuate members integrally formed on the upper surface of the insert adjacent each end of the aperture and engaging the lower end of the valve bonnet bushing to thereby provide a trunnion, whereby the ball valve is tilted relative to the valve seat during the sliding movement of the stem cam surfaces relative to the tapered bearing surfaces in the insert.

3. In a dual-action ball valve of the type wherein a valve stem is mounted in a valve bonnet and a bonnet bushing and threadably connected at its upper end to a drive nut connected to a hand wheel and its lower end slidably received in the wall valve, whereby initial rotation of the hand wheel to open the valve causes the ball valve to move away from the valve seat and continued rotation causes the ball valve to rotate 90° to the open position, the improvement comprising a sleeve fixedly mounted within the valve bonnet and surrounding the valve stem, *said stem being slidable in the sleeve, said sleeve being readily removable and replaceable,* a pair of spiral slots provided in the side wall of said sleeve, *said slots extending through the side wall of sleeve and each having at least one closed end,* a transverse guide pin mounted in the valve stem and having its opposite end portions extending into the sleeve slots, an insert member mounted on the upper wall of the ball valve, said insert member comprising a disc having an aperture, the lower end of said valve stem extending through said aperture, said aperture having tapered bearing wall surfaces cooperating with sloping cam surfaces on the lower end portion of the valve stem, and an arcuate concave portion provided on the lower end of the valve stem, and a correspondingly configured convex portion provided on one of the side walls of the insert aperture, whereby the concave portion on the stem is adapted to receive the convex portion on the insert side wall to thereby enhance the holding of the ball valve in the closed position.

*4. The dual-action ball valve of claim 1, 2 or 3 in which the bonnet is bolted to a valve body in which the ball is mounted, whereby the bonnet may be removed from the valve body by unbolting it for inspection and in-line repair and may then be reinstalled by bolting it to the valve body.*

*5. The dual-action ball valve of claim 1, 2 or 3 wherein said sleeve is spaced above said bushing in the bonnet and there is a seal between the upper end of the bushing and the lower end of the sleeve.*

*6. The dual action ball valve of claim 1, 2 or 3 in which each of said spiral slots in closed at both ends.*

*7. The dual action ball valve of claim 1, 2 or 3 in which the sleeve is spaced above said bushing in the bonnet and there is a seal between the upper end of the bushing and the lower end of the sleeve and in which the spiral slots are closed at both ends.*

*8. The dual action ball valve of claim 1, 2 or 3 in which the sleeve has an outside diameter at its lower end which is larger than the diameter of the rest of the sleeve to enable the sleeve to fit snugly within the bonnet.*

* * * * *